Oct. 13, 1931.  K. S. TRENT  1,827,122
REVERSE YOKE FOR LOCOMOTIVE VALVE GEARS
Filed Feb. 28, 1929  2 Sheets-Sheet 1
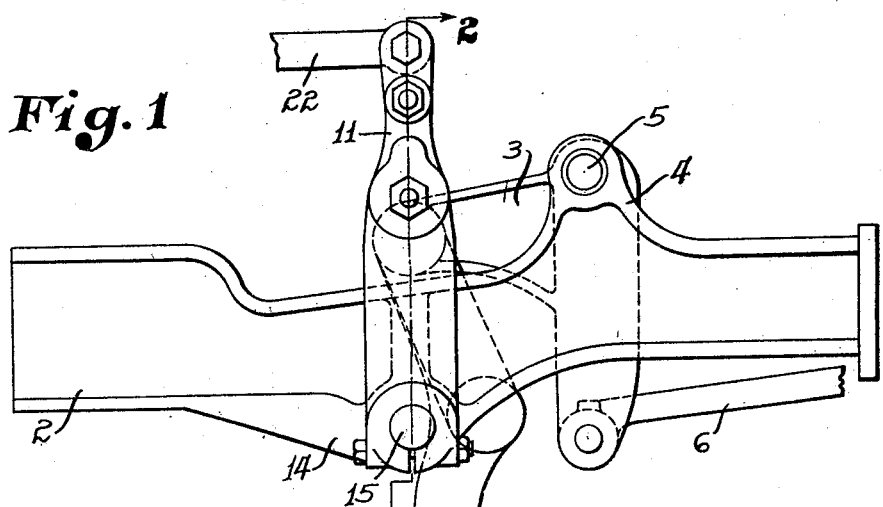
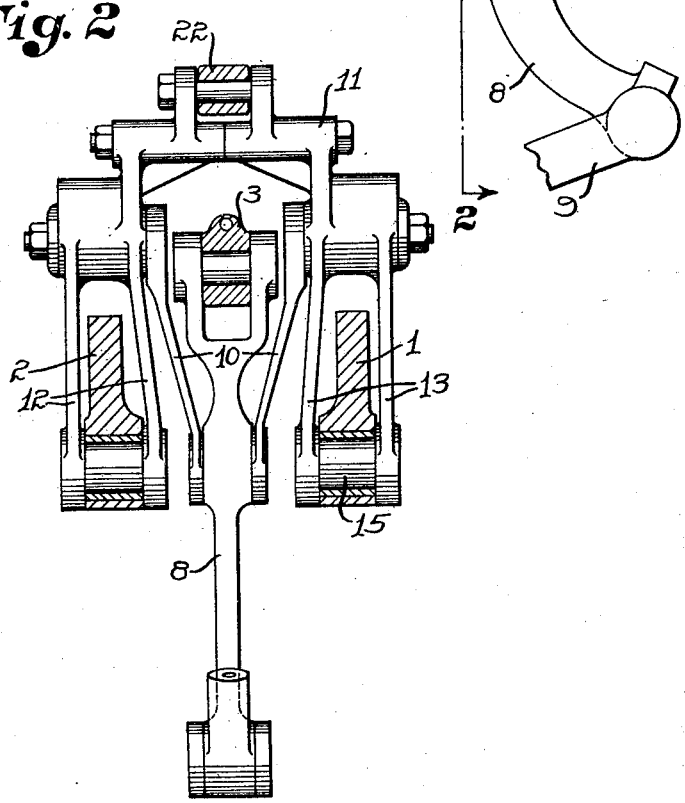
INVENTOR
Kline S. Trent
by Owen & Owen
his attorneys Oct. 13, 1931.        K. S. TRENT        1,827,122
REVERSE YOKE FOR LOCOMOTIVE VALVE GEARS
Filed Feb. 28, 1929        2 Sheets-Sheet 2

INVENTOR
Kline S. Trent
by Owen & Owen
his attorneys

Patented Oct. 13, 1931

1,827,122

UNITED STATES PATENT OFFICE

KLINE S. TRENT, OF ROANOKE, VIRGINIA, ASSIGNOR TO THE PILLIOD COMPANY, OF SWANTON, OHIO, A CORPORATION OF OHIO

REVERSE YOKE FOR LOCOMOTIVE VALVE GEARS

Application filed February 28, 1929. Serial No. 343,280.

This invention relates to locomotive valve gears, but more particularly to reverse yokes for valve gears, and an object is to provide a simple and efficient reverse yoke which is sturdy and rugged in construction and reliable in operation. Other objects and advantages will hereinafter appear.

The invention is shown by way of illustration in the accompanying drawings, in which:

Fig. 1 is a side elevation of a portion of a locomotive valve gear showing the way in which the reverse yoke is mounted;

Fig. 2 is a transverse section substantially on the line 2—2 of Fig. 1;

Figures 3, 4:
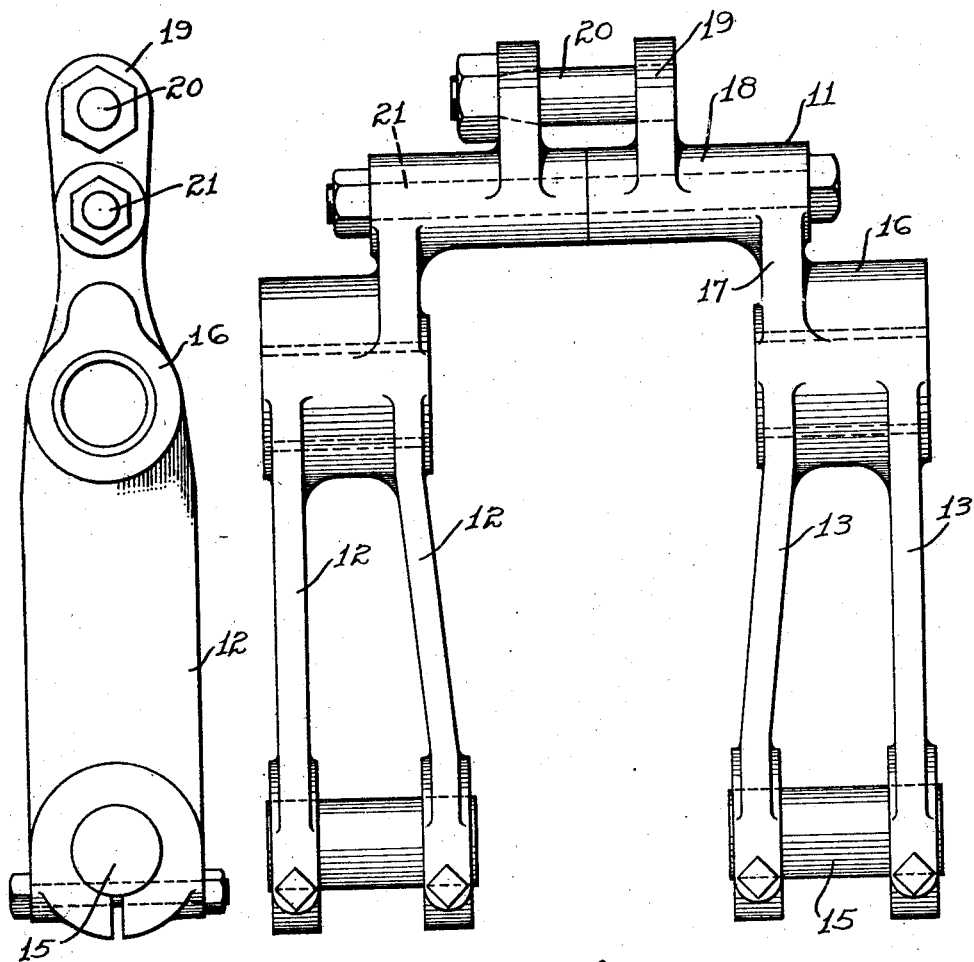
Fig. 3 is a front elevation of the reverse yoke.
Fig. 4 is a side elevation of the reverse yoke.

Referring to the drawings, only so much of a locomotive valve gear is shown as is considered necessary to explain the invention. In the drawings, there is shown a valve gear frame consisting of side bars 1 and 2 spaced horizontally from each other. Pivotally mounted between the side bars 1 and 2 is a bell crank 3, there being an upwardly extending projection 4 on the side bars to provide a pivotal mounting 5 for the bell crank. Pivoted to the vertical arm of the bell crank 3 is the usual valve rod 6, and pivoted to the horizontal arm of the bell crank is one end of the gear connecting rod 8. The lower end of the gear connecting rod is pivoted to the eccentric rod 9. Intermediate the ends of the gear connecting rod 8 are pivoted radius bars 10. The opposite ends of the radius bars 10 are pivoted to the reverse yoke 11.

The above described arrangement of parts forms a part of the so-called Baker valve gear, which is well known to those skilled in this art, and further description of the construction and operation thereof is deemed unnecessary.

In accordance with this invention the reverse yoke 11 is provided with pairs of bifurcated arms 12 and 13. The arms 13 straddle the side bar 1, and the arms 12 straddle the side bar 2 of the gear frame. It will be observed that the side bars are provided with downwardly extending portions 14 to receive the pivot pins 15 connecting the pairs of bifurcated arms.

The reverse yoke 11 is made up of two parts of similar construction, thereby facilitating in the assembly and manufacture of the structure. As shown, the legs 13 are integral with an enlarged boss 16, in which a radius bar 11 is pivoted and which is connected by web 17 to an inwardly extending tubular portion 18. Rising from the tubular portion 18 is a lug 19, and the two parts of the reverse yoke are connected together by a bolt 20 joining the lugs 19 and a bolt 21 joining the tubular portions 18. Pivoted to the bolt or pin 20 is the reach rod 22 extending to the locomotive cab for operation of the reverse yoke.

From the above description, it will be apparent that an exceptionally sturdy and rugged reverse yoke is provided of sufficient strength to withstand the jars, vibrations and torsional strains imparted thereto. Both ends of each pivot pin 15 are rigidly secured in the legs 12 or 13 so that both sides of the yoke are strongly braced. A cardinal advantage of the construction also resides in the feature of having the reverse yoke made up of two similar parts detachably secured together. This not only simplifies the problem of manufacture, but also facilitates assembly of the valve gear structure.

It is to be understood that numerous changes in details of construction and arrangement may be effected without departing from the spirit of the invention, especially as defined in the appended claims.

What I claim is:

1. In a valve gear, a frame having two laterally spaced side bars, a reverse yoke, a reach rod connected centrally to the yoke, a bearing at each side of the yoke, radius bars in the space between the sides of the yoke pivotally connected to the respective bearings, a pair of spaced integral depending legs formed on each bearing and receiving the respective side bars in the space therebetween and pivot pins extending through the legs through the respective side bars whereby to connect said parts.

2. In a valve gear, a frame having two laterally spaced side bars, a reverse yoke formed of two similar sections each having a laterally extending tubular part, members projecting upwardly from said parts, means to connect the members together, a bolt extending through the tubular parts for connecting same, a reach rod connected centrally to the yoke, a bearing connected to each side of the yoke and disposed below said tubular parts thereof, radius bars pivoted in the respective bearings, a pair of spaced depending legs formed integral with each bearing and straddling the respective side bars of the frame, and pivot pins extending through the lower ends of the legs and through the respective side bars to connect said parts together.

In testimony whereof I have hereunto signed my name to this specification.

KLINE S. TRENT.